Jan. 21, 1964 W. BEISSNER 3,118,482
PNEUMATIC TIRE FOR VEHICLES
Filed May 2, 1961
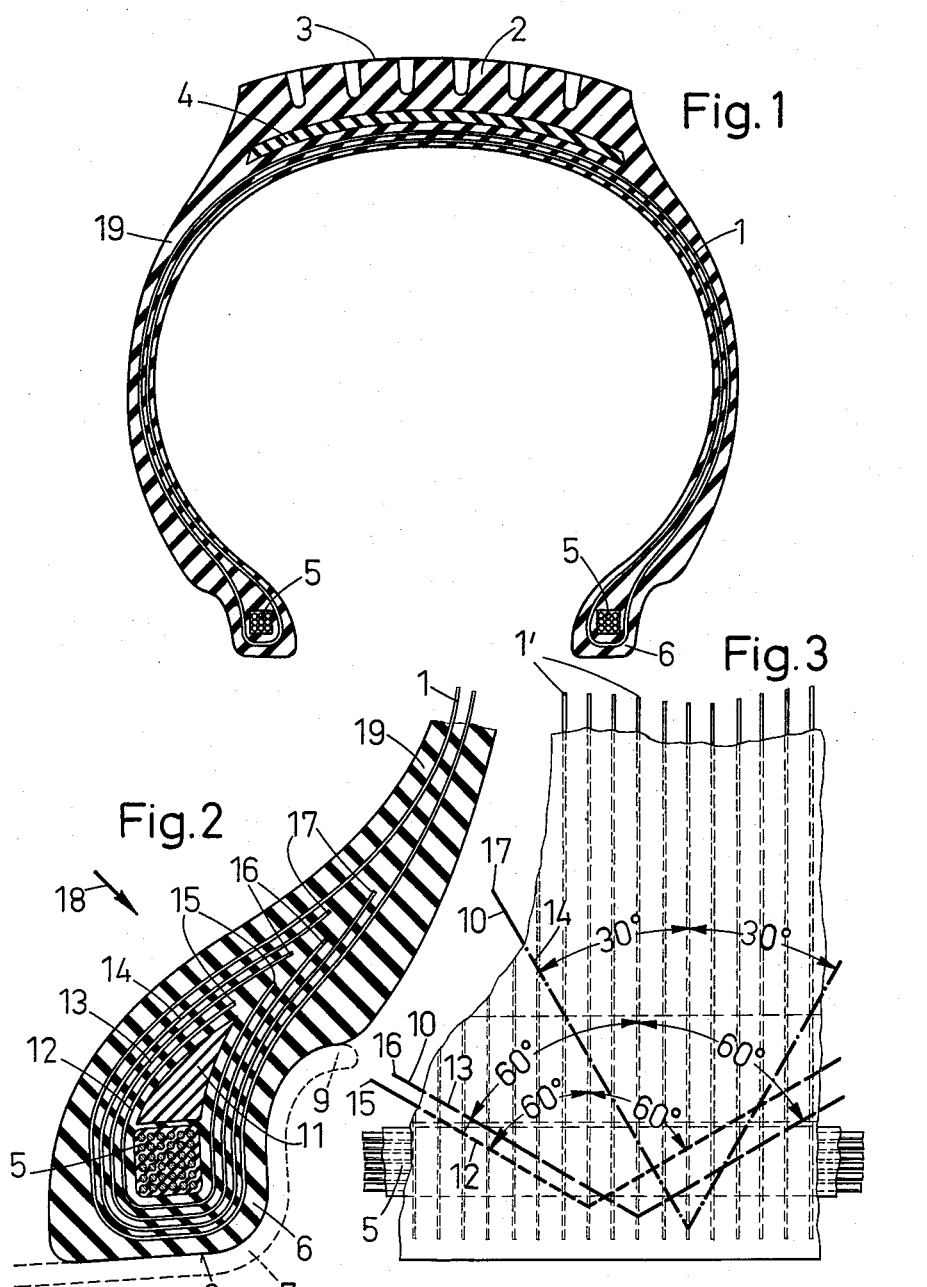
INVENTOR
Wilhelm Beissner
BY

United States Patent Office 3,118,482
Patented Jan. 21, 1964

3,118,482
PNEUMATIC TIRE FOR VEHICLES
Wilhelm Beissner, Hannover, Germany, assignor to Continental Gummi-Werke Aktiengesellschaft, Hannover, Germany
Filed May 2, 1961, Ser. No. 107,124
Claims priority, application Germany July 5, 1960
2 Claims. (Cl. 152—354)

The present invention relates to a pneumatic tire for vehicles and, more specifically, concerns a pneumatic tire with a radial carcass and with an annular reinforcing insert arranged below the tread surface and having approximately the same width as the tread surface. The pneumatic tire involved in the present invention is furthermore provided with flippers composed of substantially parallel threads, cords, and the like which are looped around the bead cores of the tires and the edges of which are stepped in the direction toward the tire side walls.

Pneumatic tires of this type equipped with a radial carcass excel in great softness of their side walls. Due to the threads, cords, or the like, of the carcass which are located in the tire side walls and extend in radial direction with regard to the tire axis, the side walls of the tire are very flexible. However, with tires of this type, there exists the danger that the tire body may be damaged at the level of and above the wheel flange due to the fact that the tire walls deform considerably. Already, after a relatively short running period of the tire, detachments in the tire walls close to and above the bead cores have been observed, and mechanical destructions of these tire parts may occur.

It is, therefore, an object of the present invention to provide a pneumatic tire of the above mentioned general type, which will overcome the drawbacks outlined in the preceding paragraph.

It is another object of this invention to provide a pneumatic tire of the above outlined general character, in which the tire body above the bead cores will be influenced in such a way that, within the range of the wheel flange, it will still have sufficient stiffness to overcome the above mentioned drawbacks, while the stiffness will gradually decrease in the direction toward the tire side wall.

These and other objects and advantages of the invention will appear more clearly from the following specification in connection with the accompanying drawing, in which:

FIG. 1 illustrates a section through a pneumatic tire according to the invention with a radial carcass;

FIG. 2 is a section through a bead portion of the tire according to FIG. 1, but on a larger scale than the latter.

FIG. 3 illustrates a side view of the structure shown in FIG. 2 while emphasizing individual threads of the flippers.

In order to overcome the above outlined drawbacks of heretofore known pneumatic tires of the character outlined above, the threads, cords, or the like, of the flippers, the edges of which are stepped in the direction toward the tire side walls, are so placed with regard to the thread means of the radial carcass that they form different angles with the threads, or the like, of the carcass, preferably angles of from 30 to 60 degrees. In this connection, it is advantageous so to arrange the flippers that those flippers which have the greatest length, i.e., extend farthest in the direction toward the tire wall, form the smallest angle with the thread means of the carcass, the term "thread means" covering threads, wire strands, cables or the like.

Referring now to the drawing in detail, the pneumatic tire shown in FIG. 1 comprises a carcass 1 composed of threads, cords, or the like, and also comprises an annular belt or breaker strip 4 extending substantially over the width of the tread strip 2 and located between carcass 1 and tread surface 3. The said circumferential belt 4 may consist of two or more cord layers in such a way that the threads, or the like, of said layers, extend at an angle with regard to the circumferential direction of the tire, while, however, the threads, or the like, of adjacent layers cross each other.

The threads, cords, or the like, of carcass 1 which are arranged in cord layer fashion extend along the shortest distance from one bead core 5 composed of wound wires to the adjacent bead core 5 in such a manner that they are located in planes radial to the main axis of the tire or are, at least, substantially located in said planes.

The tire beads 6 are, in a manner known per se, provided with a seat surface 8 for mounting the tire on the wheel flange or rim flange 9.

Between the threads, cords, or the like, of carcass 1 and the bead core 5, there are provided the flippers, e.g. 12, 13, 14, composed of substantially parallel threads 10 and looped around the bead core 5. In addition thereto, there is provided a rubber ring 11 of a substantially triangular cross section which extends around the bead cores 5.

According to FIGS. 2 and 3, the bead core 5 is surrounded by three flippers 12, 13, and 14, said flipper 12 being closest to the bead core 5. The flipper 12 is relatively short so that the stepped ends 15 extend approximately to the level of the rim flanges 9. The flipper 13 is somewhat longer than flipper 12 so that the ends 16 of core flag 13 are located higher than the ends 15 of flipper 12. The flipper 14 extends farthest in the direction toward the tire side wall 15 and has its ends designated with the reference numeral 17. It will, thus, be seen that the ends 15, 16, and 17 are stepped with regard to each other. In addition thereto, a fine stepping will be obtained by having the two ends of each flipper extend to a different extent in the direction toward the tire side wall 19.

Of particular importance is the arrangement of the threads 10 and their location with regard to the arrangement of the threads, or the like, forming the carcass 1. The two inner flippers 12 and 13 are so arranged that their threads 10 form with the threads, or the like 1' of the carcass an angle of approximately 60°, whereas the outer flipper 14 which extends farthest in the direction toward the side wall 19 forms with threads 1' a smaller angle, namely, an angle of approximately 30°.

Due to this arrangement of the flippers, the tire side wall will be relatively stiff at 18, i.e. at the level of the wheel or rim flange 9. Above the said flange 9, the flexibility of the tire wall gradually increases. In this connection, it is important that, as has been mentioned above, the thread angle of threads 10 which extend farthest in the direction toward the tire side wall 15 form a similar angle with threads 1'.

As will be evident from the above, the arrangement of the threads, or the like, forming the flippers, in conformity with the present invention, influences the tire body above the bead core in such a way that the tire body within the range of the wheel or rim flange 9 will have sufficient stiffness to prevent premature wear of the tire, while the stiffness gradually decreases in the direction toward the tire side wall. Thus, with relatively stiff walls of the tire body within the range of the wheel or rim flanges, the flexibility of the tire above said flanges will gradually increase. Consequently, damages of the tire wall, by the rim, especially the rim flange, will be avoided because major deformations of the tire wall, which, with heretofore known types caused a damage to the tire walls, can occur only above said rim flange.

It is, of course, to be understood that the present invention is, by no means, limited to the particular constructions shown in the drawings, but also comprises any modifications within the scope of the appended claims.

In this connection, it is to be understood that, while, according to the preferred embodiment shown in the drawing, three flippers, namely, the flippers 12, 13, and 14, have been employed, it is also possible to employ additional flippers. Furthermore, the threads 10 may form a somewhat different angle with the threads 1' over the corresponding angle shown in the drawing.

What I claim is:

1. In a pneumatic tire having soft side walls, a tread surface, beads provided with bead cores and merging with the tire side walls along a step for receiving the outer marginal portion of a wheel rim, and a radial carcass comprising thread means extending from bead core to bead core at a right angle to the direction of rotation of the tire: annular pull-resistant reinforcing insert means interposed between the carcass and said tread surface and having a width approximating that of said tread surface for laterally stabilizing said tire, and groups of substantially parallel thread means extending around said cores and the end portions of the thread means extending along the carcass body from the cores, each said groups of thread means forming a flipper, said flippers being of respectively different lengths so the ends of said thread means of said flippers are stepped in a direction toward the respective adjacent side wall of the tire, the thread means of said flippers respectively forming different angles with said thread means of said radial carcass in such a way that the thread means of the longest flippers form a smaller angle with the thread means of the respective adjacent radial carcass than other flippers pertaining to the same bead core, the angle formed by said thread means of said flippers with the thread means of said radial carcass increasing with decreasing flipper length from the longest flipper to the shortest flipper extending around one and the same bead core, the longest flipper pertaining to each bead core having its free ends ending slightly above the bead step of the respective bead which receives a wheel rim for supporting the tire.

2. A tire according to claim 1, in which the thread means of the flippers respectively form with the thread means of the respective adjacent radial carcass portion different angles ranging from 30 to 60°.

References Cited in the file of this patent
UNITED STATES PATENTS

| | | |
|---|---|---|
| 1,853,827 | Mallory | Apr. 12, 1932 |
| 2,063,105 | King | Dec. 8, 1936 |
| 2,155,564 | Schippel | Apr. 25, 1939 |
| 2,493,614 | Bourdon | Jan. 3, 1950 |